United States Patent
Capeau et al.

(10) Patent No.: US 10,919,783 B2
(45) Date of Patent: Feb. 16, 2021

(54) METHOD AND DEVICE FOR TREATING LIQUID SLUDGE AND FILTER CAKES OBTAINED BY SAID METHOD

(71) Applicant: OREGE, Jouy en Josas (FR)

(72) Inventors: Patrice Capeau, Marseilles (FR); Pascal Gendrot, Jouy en Josas (FR)

(73) Assignee: OREGE, Jouy en Josas (FR)

( * ) Notice: Subject to any disclaimer, the term of this patent is extended or adjusted under 35 U.S.C. 154(b) by 1015 days.

(21) Appl. No.: 15/039,812

(22) PCT Filed: Nov. 27, 2014

(86) PCT No.: PCT/FR2014/053063
§ 371 (c)(1),
(2) Date: May 26, 2016

(87) PCT Pub. No.: WO2015/079175
PCT Pub. Date: Jun. 4, 2015

(65) Prior Publication Data
US 2017/0029291 A1    Feb. 2, 2017

(30) Foreign Application Priority Data

Nov. 27, 2013 (FR) .................................. 13/61706
Dec. 6, 2013 (FR) .................................. 13/02857

(51) Int. Cl.
*C02F 1/24* (2006.01)
*C02F 1/20* (2006.01)
(Continued)

(52) U.S. Cl.
CPC ............ *C02F 1/24* (2013.01); *B01D 21/0084* (2013.01); *B01D 21/08* (2013.01);
(Continued)

(58) Field of Classification Search
CPC .. C02F 1/24; C02F 1/20; C02F 1/5281; C02F 1/56; C02F 111/121; C02F 11/14;
(Continued)

(56) References Cited

U.S. PATENT DOCUMENTS 4,869,829 A * 9/1989 Casey .................... B01D 15/00
                                                         210/706
2008/0047903 A1  2/2008 Morse
2013/0227997 A1  9/2013 Capeau et al.

FOREIGN PATENT DOCUMENTS

EP       323610 A *  7/1989
FR    2 966 818 A1   5/2012

OTHER PUBLICATIONS

International Search Report dated Feb. 19, 2015, issued in corresponding International Application No. PCT/FR2014/053063, filed Nov. 27, 2014, 5 pages.
(Continued)

*Primary Examiner* — Thomas M Lithgow
(74) *Attorney, Agent, or Firm* — Christensen O'Connor Johnson Kindness PLLC

(57) ABSTRACT

Treating and conditioning liquid sludge and a solidified sludge cake obtained thereby are disclosed. A first emulsion of sludge is formed in an in-line container fed at a first flow rate Q owing to the impact of the sludge with air injected into the container at a rate Q', where Q'>5Q, in a first region which has a small volume of less than 0.05 m3. The first emulsion is then transferred into a second region of the container extending over a first length, and is then discharged via a component which generates a head loss in a chamber extending over a second length. A flocculant is injected in order to obtain a second coagulated emulsion, which is at least partially degasified. The matter in suspension in the second emulsion obtained in this way is then filtered or decanted.

33 Claims, 7 Drawing Sheets

(51) Int. Cl.
*C02F 1/52* (2006.01)
*C02F 1/56* (2006.01)
*C02F 11/121* (2019.01)
*C02F 11/14* (2019.01)
*B01D 21/00* (2006.01)
*B01D 21/08* (2006.01)
*B01D 21/24* (2006.01)
*B01F 3/04* (2006.01)
*C02F 1/74* (2006.01)
*B01F 5/02* (2006.01)
*B01D 21/28* (2006.01)

(52) U.S. Cl.
CPC ...... *B01D 21/2494* (2013.01); *B01F 3/04021* (2013.01); *B01F 3/04078* (2013.01); *C02F 1/20* (2013.01); *C02F 1/5281* (2013.01); *C02F 1/56* (2013.01); *C02F 11/121* (2013.01); *C02F 11/14* (2013.01); *B01D 21/28* (2013.01); *B01F 5/0268* (2013.01); *C02F 1/74* (2013.01); *C02F 2209/38* (2013.01); *C02F 2209/40* (2013.01); *C02F 2301/066* (2013.01); *C02F 2303/02* (2013.01)

(58) Field of Classification Search
CPC .. C02F 2301/066; C02F 2303/02; C02F 1/74; C02F 2209/40; C02F 2209/38; B01D 21/0084; B01D 21/08; B01D 21/2494; B01D 21/28
USPC .............................................. 210/703, 221.2
See application file for complete search history.

(56) References Cited

OTHER PUBLICATIONS

Written Opinion dated Feb. 19, 2015, issued in corresponding International Application No. PCT/FR2014/053063, filed Nov. 27, 2014, 9 pages.

International Preliminary Report on Patentability dated Mar. 23, 2016, issued in corresponding International Application No. PCT/FR2014/053063, filed Nov. 27, 2014, 9 pages.

* cited by examiner

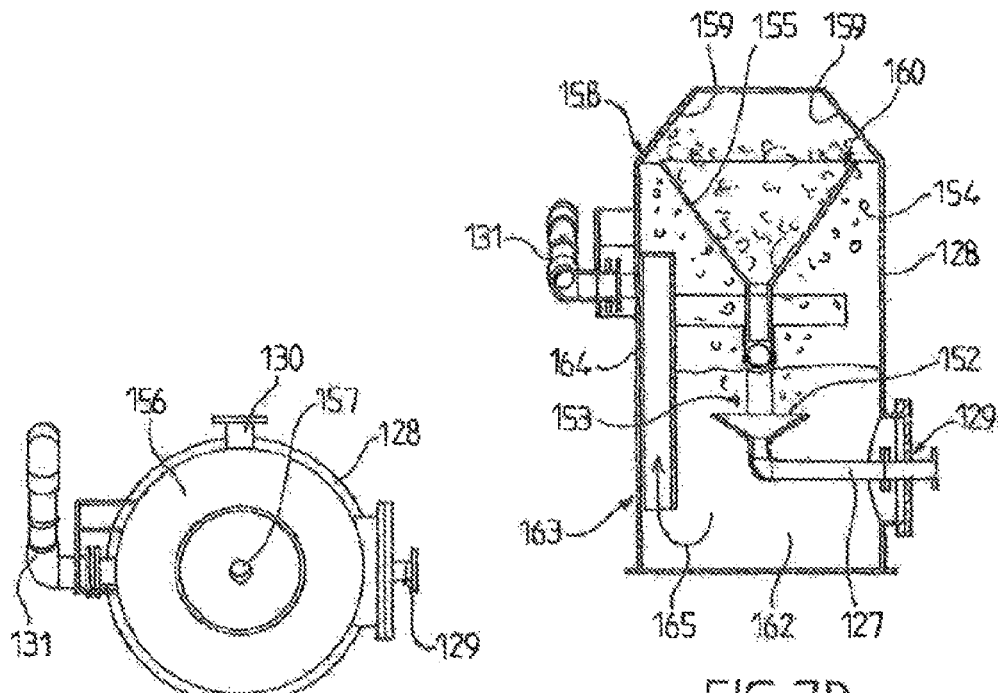
FIG.7A
FIG.7B
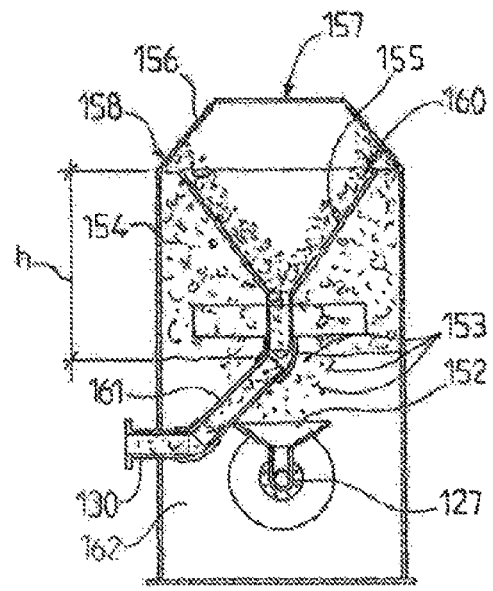
FIG.7C

METHOD AND DEVICE FOR TREATING LIQUID SLUDGE AND FILTER CAKES OBTAINED BY SAID METHOD

The present invention relates to a process for treating liquid sludge by injection of air into a sludge stream.

It also relates to a device for treating liquid sludges using such a process and the sludge cakes obtained with the latter.

The invention has a particularly important although non-exclusive application in the field of the thickening and/or the reduction in volume of sludges resulting from a water treatment and/or accumulated in industrial water settling tanks.

Sludge thickeners which make it possible to improve the dryness of compact sludges by means of mechanical scrapers moving on the permeable bottom of storage tanks are already known (FR 2 729 383).

Such devices comprise clogging risks which require unclogging means, and exhibit the fragilities of mechanical equipment.

Processes for thickening sludges resulting from water treatment by flocculation/settling requiring superficial degassing, the injection of a reflocculation reagent into the sludges and, finally, thickening in at least one lamellar thickener are also known. Here again, the thickening is provided mechanically and cannot avoid frequent clogging.

Draining table systems are also known, but they have, however, significant exploitation constraints, and require facilities of considerable size.

Mechanical thickening systems of rotary drum type are also known.

These are systems which are robust but limited in terms of results, since they do not make it possible to expect thickening greater than 30 to 40 g/l of DM.

Static thickening systems formed by settling tanks are also known.

In the case of static thickening, the residence times are, however, considerable and unfortunately generate anaerobic evolution of the sludges, causing nauseating odours and an increase in the colloidal nature of said sludges.

A process for desiccation of sludge by injecting air into a sludge stream, the efficiency of which can be further improved, is also known (FR 2 966 181).

The present invention aims to provide a process and a device which are better at satisfying the practical requirements than those previously known, in particular in that they do not use mechanical systems capable of seizing up or else systems which generate a structural modification of the sludges to be treated, but hydraulic systems, and also inexpensive reagents (compressed or boosted air, conventional flocculant), this being so while allowing rapid decontamination of the sludges, the use of the thickening process according to the invention requiring only a few seconds or minutes.

To do this, the invention works on the principle of a continuous or semi-continuous (by alternate batch) treatment and/or thickening of a sludge, in which an enclosure is fed with the sludge in continuous flow while simultaneously injecting therein air with a high flow rate (several tens, or even hundreds of $Nm^3/h$) causing high velocities V of the emulsion obtained, at the position where the air and the sludge meet (V>10 m/s) (for example 50 m/s), the emulsion being formed from a multitude of droplets of sludge in the strong air stream, a predetermined pressure drop is created in the emulsion by narrowing in and/or at the outlet of the enclosure, a flocculant is injected after such a narrowing, said emulsion is degassed at atmospheric pressure and everything is recovered in a filtering or settling device.

Advantageously, the sludges are also rapidly concentrated downstream online in a container with a weir.

With this aim, the invention provides in particular a process for treating and conditioning liquid sludges, in which a first emulsion of sludge is created in a pressurized online container continuously fed with the sludge at a first flow rate Q ($m^3/h$) by blasting the sludge with air injected into the container at a flow rate Q' ($Nm^3/h$), with Q'>5Q, then it is discharged at the outlet of the container via a member generating a pressure drop before recovery of the emulsion and degassing, then the suspended matter of the emulsion thus obtained is filtered off or left to settle, separating it from the liquid part which is continuously emptied out, characterized in that the sludge and the air are injected into a first zone of the container, then the emulsion thus formed is discharged toward a second zone of the container extending over a predetermined first length $\underline{L_1}$, the injection of air and of sludge into the first zone and the length $L_1$ being suitable for constituting said first emulsion formed from drops of sludge in the air, in that the discharging is carried out in an enclosure extending over a predetermined second length $\underline{L_2}$, into which at least one flocculant is injected, in order to obtain in said enclosure a second emulsion of air in the coagulated and flocculated sludge, and in that said second emulsion is at least partially degassed by venting of the enclosure.

Advantageously, the first zone is a small volume in particular confined between two side walls (such as in a Venturi or a piping restriction for example) and for example less than 0.005 $m^3$.

The term "semi-continuously" is intended to mean by successive batches, which are substituted one after the other on the fly, or substantially without stopping, so as to enable continuous or semi-continuous treatment, consequently allowing an excellent rate.

It is observed here that the first emulsion is rather a sludge emulsion. This is intended to mean an emulsion where the sludge is in a phase dispersed in air which is the continuous phase.

The second emulsion is, on the other hand, instead an emulsion of gas in the sludge, the flocculant having blocked micrometric or millimetric gas bubbles within the sludge flocs.

The particularly reduced size of the injection zone (for example 0.01 $m^3$) will allow excellent sludge/air mixing.

There is in fact at this site a high-velocity zone, causing kinetic impacts, which allows the sludge to break up in the gas. The emulsion thus obtained then passes into the second zone of the container which extends over a certain length.

It should be noted that the first and second zones can be separated by a restriction (a Venturi and/or an orifice) forming the two zones in two chambers which are separate.

This length necessarily causes, even if it is slight, a depression gradient toward the outlet of the container which is found to allow an agglomeration, coagulation, compaction of the sludge, then preparing the first emulsion thus modified for the treatment which follows.

Advantageously, the predetermined first length $\underline{L_1}$ is greater than fifty centimetres, for example greater than 1 m, for example 1 m 50.

A pressure/reduced pressure sequence is thus carried out, which surprisingly creates a state of the matter (emulsion) that makes it possible to obtain in the end a greater gain in dryness.

In particular, the pressure brings an energy capable of destabilizing and breaking the electrostatic bonds (Coulomb type) or dipolar bonds (Van des Waals type) and thus causing the water to exit the organic fractions.

The dispersion which follows produces, for its part, a sludge acceleration movement and an expansion or drawing toward the zone of less pressure, continuing the colloid destabilizing and destructuring effect and a bond-breaking effect.

Optionally and in advantageous embodiments, sequences of compression then reduced pressure are again repeated in order to prolong/simplify/produce the desired effects.

In this case, the technical effect obtained by the invention is first and foremost linked to the porosification of the sludge obtained by virtue of the blasting of the sludge with the air under the reactor dimension and active-zone conditions, then the pressure drop between container and enclosure which will be proportioned more precisely and naturally by a person skilled in the art as a function of the effluent treated, of the flow rates used and of the flocculant used.

Air is introduced into the sludge stream, thus causing an impact between the air and the sludge, then pressure differentials for example as will be seen using a Venturi system with air suction.

Advantageously, the predetermined second length $L_2$ is, for its part, greater than 1 m, more advantageously greater than 2 m or 3 m, for example 5 m or more.

In advantageous embodiments, there is in addition and/or moreover recourse to one and/or the other of the following arrangements:

the average pressure P in the container is such that 1.5 bar<P<10 bar and Q' is such that 10 Q≤Q'≤100 Q, for example Q'>50 Q;

the emulsion is strongly degassed at the outlet of the container, for example inside a degassing chamber equipped with stirring means;

the online container is a column with an average diameter $\underline{d}$ and a height H≥10 $\underline{d}$, the sludge being introduced in the bottom part of the column in the gaseous bed created by the air injected at the level of said sludge feed (for example above or below);

the liquid sludge is projected in the column onto an internal screen or wall of the container so as to improve the breaking up of said sludge in the gaseous stream. To do this, the outlet in the sludge-feed container is advantageously located opposite a wall and/or the screen, at a short distance, for example less than 5 cm;

the sludge is introduced in the bottom part of the container via a static mixer. A static mixer is a system known in itself, not supplied with energy, located in the sludge-feed tube and comprising, for example, static stirring blades and/or oblique diaphragms, etc;

the flocculant is a polymer injected at the immediate outlet of the container, before the venting. It is, for example, an organic flocculant of cationic type;

at least one reagent taken from sand, calcium carbonate, slaked lime, the oxidation reagents and/or the reagents assisting coagulation is introduced, upstream of the container, into the sludge stream;

at least one reagent taken from sand, calcium carbonate, slaked lime, the oxidation reagents and/or the reagents assisting coagulation is introduced downstream of the container;

the enclosure is tubular with an average through-cross-section equivalent to that of the container;

the tubular enclosure comprises at least one element which generates a pressure drop downstream of the outlet of the container, at the outlet of which the flocculant is injected;

the tubular enclosure comprises at least one second element which generates a pressure drop upstream of the first generator element, at the outlet of which at least one reagent and/or air are introduced;

the element(s) which generate(s) a pressure drop is (are) Venturis;

a rapid and/or approximately instantaneous (a few seconds or even minutes, for example seven to ten minutes) concentration of sludges is carried out by flotation/settling of the flocculated emulsion in a chamber delimiting a predetermined volume, acting as a concentrator, the concentrated sludge being continuously discharged, for example via an overflow.

Surprisingly, the considerable volumes of air blown in in fact generated a sludge mixed with very large air bubbles (> several millimetres) which considerably increases the ascent rates of the sludges during the flotation (ascending rate observed multiplied by a factor of ten, or even more).

Advantageously, by more or less blocking the surface of the chamber delimiting a predetermined volume, it is possible to regulate (according to the flow rates of air and of sludges used) the thickness of the floating layer, which can then and in addition settle owing to its weight, making it possible to obtain concentrations of 100 to 120 g/l of DM, in the knowledge that the quality and the transparency of the water obtained below the flocculated sludge still remains exceptional (COD less than 200 mg/l, or even 100 mg/l in the case of biological sludges);

a complementary treatment of the sludges is carried out downstream of the tubular enclosure by centrifugation, filtration and/or pressing;

the air injected is heated and/or mixed with water vapour;

the air is injected in counterflow mode with respect to the sludge, or so as to form a helicoidal flow optionally in countercurrent mode with respect to the sludge stream, or injected at a right angle to the sludge stream, or else in the direction of the sludge stream.

The invention also provides a device using the process as described above.

It provides, moreover, a device for treating and conditioning liquid sludges, comprising an online container, means for feeding said container with sludge continuously at a first flow rate Q (m³/h), means for feeding said container with air at a flow rate Q' (Nm³/h), with Q'>5Q, and means for filtering and/or settling the emulsion thus flocculated, arranged in order to separate the liquid part from the suspended matter and to recover it continuously, characterized in that the means for feeding the container with sludge and air are arranged in order to inject the sludge and the air into a first zone of the container, then to convey the mixture over a first length $L_1$ in order to form a first emulsion of drops of sludge in air, in that it comprises an enclosure for discharge of the first emulsion obtained in the container, the chamber being tubular extending over a predetermined length $L_2$, comprising venting means and means for injecting at least one flocculant into said tubular enclosure upstream with respect to said venting, so as to form a second emulsion of air in the coagulated and flocculated sludge.

The term "predetermined length $L_1$ or $L_2$" should be understood to mean a distance greater than 0.5 m, advantageously 1 m, for example 2 m, 3 m and advantageously greater than 5 m, for example 10 m.

Advantageously, the first zone of the container has a small volume less than 0.05 m³, in particular confined between two side walls (small cross section) (between which the sludge is thus introduced so as to exit toward the second zone of greater volume and/or of wider cross section).

The small volume is for example formed by a Venturi and/or is part of means for injection or of a device for simultaneous injection of air and sludge.

Advantageously, the online container is a column with an average diameter $\underline{d}$ and a height H≥10 $\underline{d}$, the sludge being introduced in the bottom part of the column in the gaseous bed created by the air injected at the level, for example a little below or a little above (one or a few centimetres), of said sludge feed.

Likewise advantageously, the column comprises, in addition, an internal screen arranged at the outlet of the means for injection into the column, for breaking up the jet of sludge.

Further advantageously, the device comprises a static mixer of the sludge upstream of the container.

Advantageously, the enclosure comprises at least one element which generates a pressure drop, for example a Venturi.

In one advantageous embodiment, the invention proposes, in addition, a degassing chamber equipped with stirring means located downstream of the container.

Advantageously, a chamber delimiting a predetermined volume is, in addition, provided for at the outlet or downstream of the enclosure, acting as a concentrator arranged so as to allow the flotation of the flocculated sludge on a predetermined height (in a range predetermined, for example, between 20 cm and 1 m of sludge thickness), equipped with means for continuous discharge of the sludge via an overflow.

The invention also provides a solidified sludge cake obtained from an organic sludge having a porosity equal or similar to that of pumice stone. The term "equal or similar" is intended to mean a porosity $$\Phi = \frac{V_{pores}}{V_{total}}$$

equal to ±20%, advantageously ±10%.

The porosity is for example calculated in a manner known per se on samples prepared after extraction of the fluids from the sample with for example an extractor known as a Soxhlet or by vacuum distillation. The total volume V total is measured for example by mensuration, then the solid volume for example with a pycnometer.

The porosity of pumice stone is for its part about 85% (±5%).

Advantageously, the density of the cake is for example between 0.5 and 0.9 g/cm³.

Advantageously, the cake is obtained by means of the process and/or the device as described above.

The invention will be understood more clearly on reading the following description of embodiments given hereinafter by way of non-limiting examples. The description refers to the drawings which accompany it, in which:

FIGS. 7A, 7B and 7C are, respectively, a view from above and sectional side views of the concentrator of FIG. 5.

Figure 1:
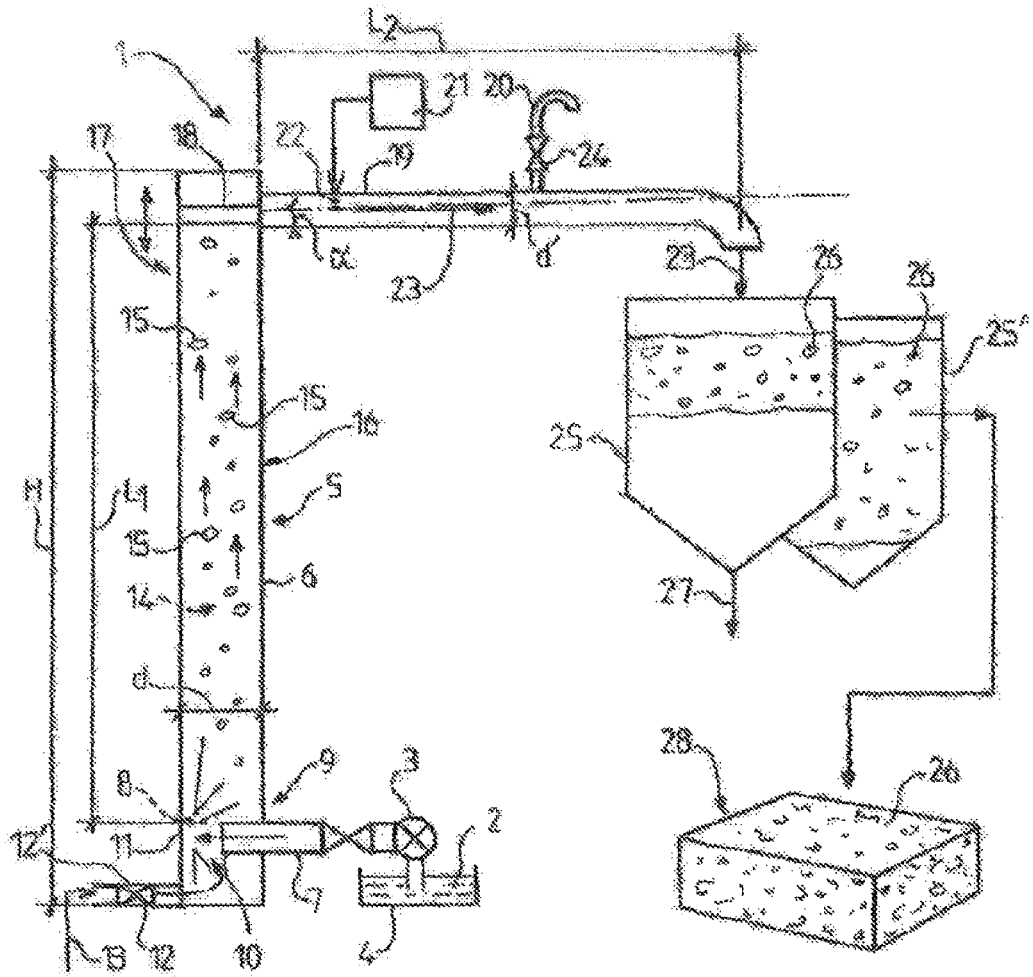
FIG. 1 is a diagram illustrating a first embodiment of a device implementing the process according to the invention.

FIG. 1 shows a device 1 for treating and conditioning liquid sludges 2 for example pumped, via a pump 3, from a reservoir 4 for storing sludges, for example contaminated sludges, with a high organic content and therefore generating in particular ammonia ($NH_3$).

The device comprises a container 5 formed by a tubular column 6 with a diameter $\underline{d}$ for example between 30 cm and 50 cm.

The sludge is injected at a flow rate Q for example of 20 cm³/h via a penetrating pipe 7 (equipped with static mixing means not represented, such as a helicoidal screw) into a first zone 8 located in the bottom part 9 of the column 6, of small volume, for example 10 l. The volume of the zone 8 is delimited by the part of the enclosure located in the volumetric extension of the end 10 of the penetrating pipe 7 and by the opposite wall 11, which is for example cylindrical, and located 5 cm from said end 10.

The device 1 also comprises a feed 12 of air 13 at a flow rate Q' (Nm³/h) of the enclosure 6, for example below the sludge feed (pipe 7). However, the air can also be fed in counterflow mode with respect to the sludge stream, for example by means of a helicoidal internal ramp 12'.

It is recalled, moreover, that the value of gas flow rates is conventionally given in Nm³/h (standard cubic metres/h), the volume (in Nm³/h) being in this case considered at its value related to a pressure of 1 bar, a temperature of 20° C. and 0% humidity, as is naturally accepted and understood by a person skilled in the art, who is an engineer in the field of chemical engineering.

The air is at raised pressure P' relative to the average internal pressure of the column 6 and is injected at a flow rate Q' much higher than the sludge flow rate, for example 500 Nm³/h.

The meeting between the air and the sludge creates a first sludge emulsion 14, with breaking up of the sludge (dispersed drops 15) in the air, said emulsion then rising in the column having a total height H, in a second zone 16 having a first length $L_1$, before reaching the top 17 of the column which comprises an outlet member 18, for example a regulating gate and/or valve allowing a continuous raised pressure of the first emulsion inside the enclosure, for example at an average pressure P of about 1.5 bar absolute, with a ΔP between the bottom 9 and the top 17 of the column of a few millibar.

According to the embodiment of the invention described here, the device 1 also comprises a tubular enclosure 19, for example having a diameter such that ½ d≤d'≤d, for discharge of the first emulsion over a predetermined second length $L_2$, for example 3 m.

The enclosure 19 comprises a vent 20 for venting its content, for example at a distance $L'_2=\frac{3}{4} L_2$ from the outlet of the column 6.

Upstream of this vent, the device 1 comprises means 21 known in themselves (metering pump, preparation container, etc.) for introducing a flocculant 22 into the enclosure 19, said means being located, for example, in the vicinity of the enclosure (for example 5 cm from the member 18), said flocculant being, for example, made up of a polymer of known type, adapted by those skilled in the art according to the sludges treated.

The formation of a second emulsion 23, this time of gas in the flocculated sludge, follows.

The tubular enclosure enables a flow initially by raised pressure and then under gravity or substantially under gravity (slope α) once the emulsion has been vented via the vent 20.

A valve 24 optionally makes it possible to regulate this venting.

The emulsion 23 then falls into reservoirs, in this case filtering bags 25, 25' making it possible to recover the dehydrated sludge 26 which floats at the surface, the clear water 27 being recovered in the bottom part. The cakes 28 of sludge 26 which are extracted from the bags are then stored and/or spread. Surprisingly, they do not have an odour or an odour of humus.

The separated water has benefited from the same physicochemical-type treatment as the sludge. The air is not trapped therein, but its redox potential has been raised, the colloidal fractions being attached to the organic matter, leaving transparent water, with a very low suspended-matter and organic-matter load. For example, a turbidity of 5 to 10 NTU is obtained, whereas, with a belt filter, water which is much more turbid, of 25 to 35 NTU, is obtained.

The filtrant is also less viscous than in the prior art, at equal initial sludge quality. A measurement of the CST gives here about 5 s, whereas the prior art obtains about 10 s.

The COD has also decreased to less than 100 mg $O_2$/l for a filtrant of biological sludge and to less than 200 mg/l for a filtrant of digested sludge (for a filtrant of the same sludge obtained with a conventional centrifuge of 1000 to 3000 mg $O_2$/l) with also a suspended matter content <50 ppm for more than 1000 ppm with the prior art under equivalent conditions.

Figure 2:
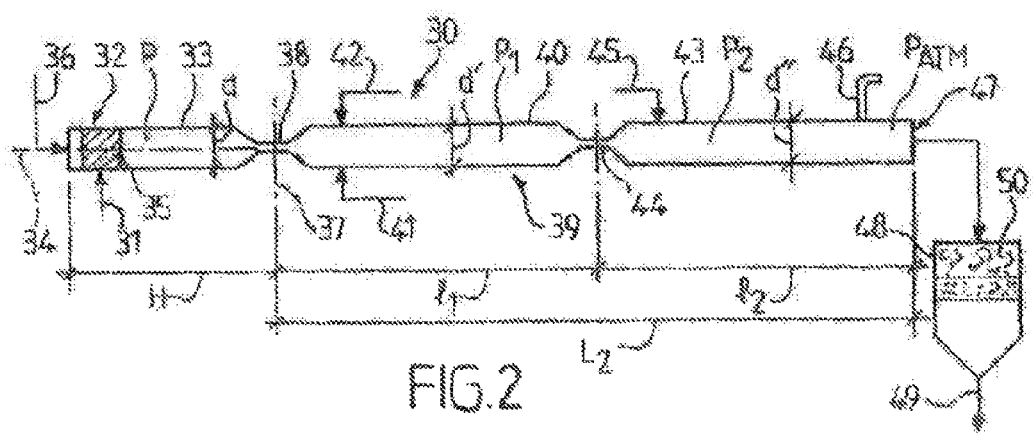
FIG. 2 is a diagram illustrating a second embodiment of a device according to the invention.

FIG. 2 shows another embodiment of a device 30 according to the invention, for treating liquid sludges introduced at an end portion 32 of a container 33 extended about an axis 34 and having a predetermined height H, for example 1 m.

The container is maintained at an average pressure P for example of 2 bar absolute, and is formed by a cylinder with a diameter $\underline{d}$, for example of 300 mm.

The sludge feeds a reduced zone 35, for example of 10 l, located at the end portion 32 which is also fed at the end of the container and upstream of the introduction of the sludge via an air inlet 36 for example at a pressure P''>P, for example 3 bar absolute.

The air is fed at a very high flow rate Q', for example 100 Nm³/h, the sludge being, for its part, introduced at a flow rate Q, for example of 10 m³/h.

The sludge 31 breaks up in the air which is at raised pressure, a slight reduced pressure ΔP existing between the container at the inlet of the sludge 35 and the outlet of the sludge emulsion downstream 37 of the container.

At the outlet of the container 33 is a Venturi 38 and/or a regulating valve generating a pressure drop, for example of 0.4 bar, the sludge emulsion here being discharged into a tubular enclosure 39 comprising a cylindrical first part 40 with a diameter d' (for example d'=$\underline{d}$) which is at a pressure $P_1$<P, for example in this case of 1.6 bar (in the example taken), into which can be injected, downstream of the Venturi, and in the vicinity thereof (for example at 10 cm so as to allow good stirring), a reagent at 41, and/or air (tap point 42).

In this embodiment, the tubular enclosure also comprises a cylindrical second part 43, separated from the first part 40 by a second Venturi 44, said second part having a diameter d″ with, for example, d'=d″=d.

Downstream of the Venturi 44, and in the vicinity thereof (1 to 10 cm) a flocculant feed 45 is provided, with means known in themselves (metering pump, etc.), and a vent 46 for venting and/or a sludge outlet 47 open to the atmosphere, the pressure $P_2$ in this second part therefore being very rapidly brought to atmospheric pressure, for example of 1.3 bar at the outlet of the Venturi, which rapidly changes to 1 bar=1 atmosphere at the outlet 47, the emulsion becoming, after the addition of the flocculant, an emulsion of air in the sludge flocs, which flow under gravity onto the end.

The total length of the enclosure $L_2 \approx l_1 + l_2$ is, for example, 10 m, with $l_1$=3 m and $L_2$=7 m, but other values are possible, the proportion between $l_1$ and $l_2$ generally, but not in a limiting manner, being such that $l_1 < l_2$.

The device 30 comprises, in addition, a filter 48 and/or a settling tank for discharge of the purified water 49 in the bottom part and of the dehydrated sludge 50 in the top part.

Figure 3:
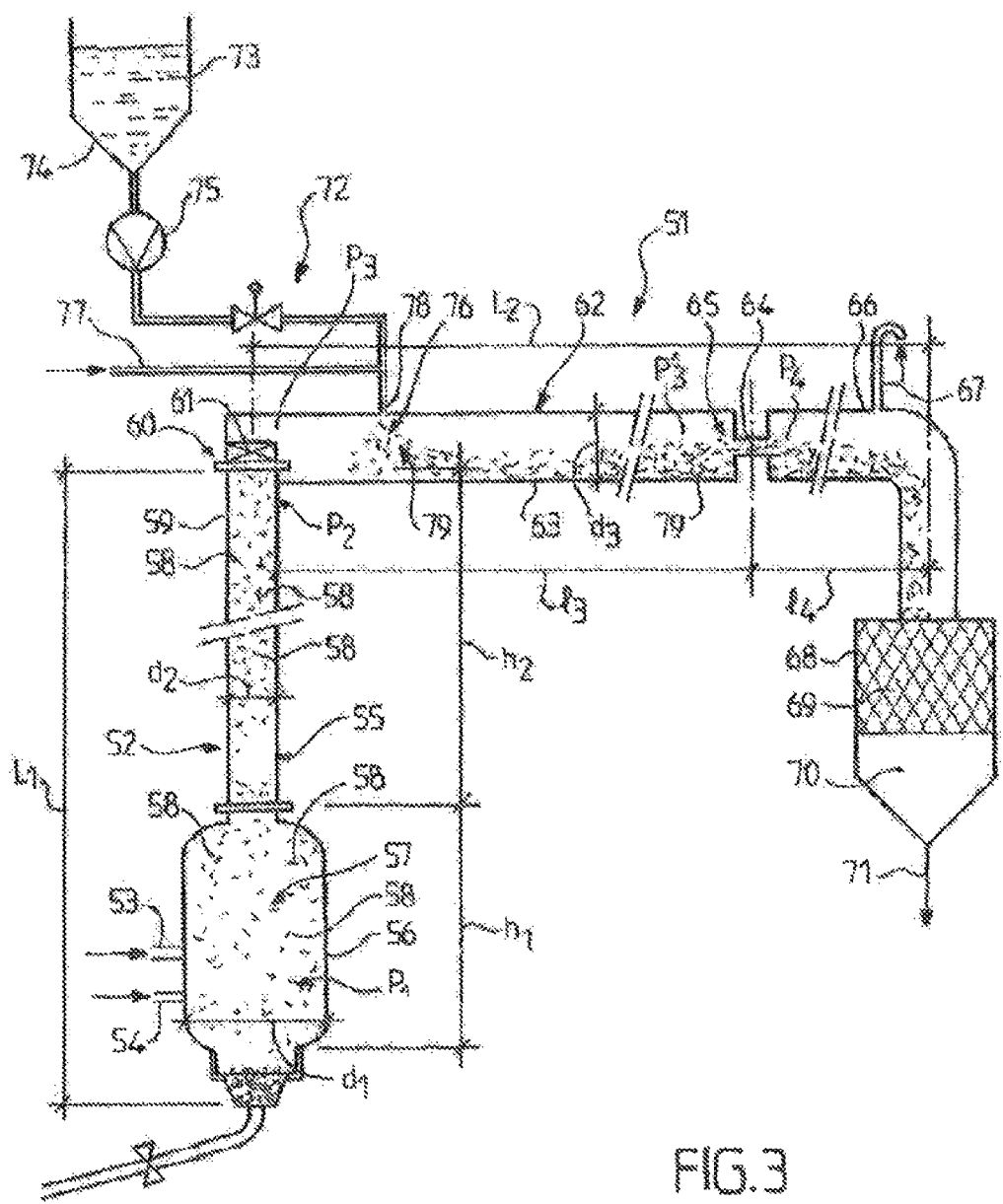
FIG. 3 is a diagram of the operating of a third embodiment of a device according to the invention.

A third embodiment of a device 51 according to the invention has been represented in FIG. 3.

The device 51 comprises a container 52 fed, via a tap point 53 in the bottom part, with liquid sludge, and below this tap point 53, fed with compressed air at a high flow rate via a second tap point 54.

Specifically, the container is formed by a vertical column 55 comprising a first part forming a reservoir 56 for very violent mixing/stirring of the air and the sludge, of small dimensions, which is for example cylindrical with a height $h_1$=50 cm and a diameter $\underline{d_1}$ of 30 cm, i.e. a volume of about 35 l, making it possible to obtain the first emulsion 57 of droplets 58 of broken sludge.

This emulsion of drops in a strong ascending stream of pressurized air subsequently penetrates into a cylindrical pipe 59, extending the reservoir 56, of smaller diameter $d_2 < d_1$, for example of 10 cm in diameter, and which extends over a length $\underline{h_2}$ for example of 1 m (with $L_1 = h_1 + h_2$).

In this column of air, the gaseous stream performs stripping of the gases contained and/or derived from the sludges and in particular of the ammonia $NH_3$, producing, surprisingly, and in a manner dependent on the operating conditions and on the organic sludges treated, a virtually complete removal of the unwanted gases (< a few ppm) trapped in the sludges.

The length $l_2$ is advantageously proportioned so as to do this by those skilled in the art.

At the top 60 of the enclosure, a regulating valve 61 and/or a gate is provided, for discharge to a tubular enclosure 62.

The pressure of the emulsion 57 goes from $P_1$ (for example 3 bar) in the initial reservoir 56, to $P_2$ (2.890 bar) slightly below $P_1$ in the top part of the column 59 of the container, at the level of the valve 61, with $\Delta P = P_2 - P_1$=a few millibar, then at the outlet of the valve to $P_3$=2 bar (owing to the pressure drop of the valve).

More specifically, the enclosure 62 comprises a first section 63 of length $l_3$ for example 5 m, which ends with a Venturi 64 which changes the pressure $P'_3 < P_3$ at the end 65 of the first section to a pressure $P_4$ in a second section 66 of the enclosure in a slope under gravity, equipped with a vent 67, the section 66 being of length $l_4$, for example 1 m, with $L_2=l_3+l_4$.

The section 66 is connected to the filter 68 for separating the suspended matter 69 from the liquid part 70, which is continuously emptied out at 71, in a manner known in itself.

The enclosure comprises means 72 for feeding with flocculant 73 from a reservoir 74 of preparation by stirring and mixing. A metering pump 75 brings the flocculant into the emulsion of sludge which leaves the container 52 at the level of the outlet of the valve 61, or in the immediate vicinity (i.e. a few cm) in a zone 76 which is quite disrupted due to the pressure drop generated by said valve 61. $P_3$ is here and, for example, sequentially taken from $P_2 \approx 2$ bar to $P_3=1.4$ bar, $P_4$ being, for its part, at atmospheric pressure, or approximately at atmospheric pressure owing to the vent 67.

In this embodiment, an additional air inlet 77 has also been provided, injected for example sequentially with the flocculant by the tap point 78, or in parallel.

The emulsion 79 at the outlet of the treatment with the flocculant becomes an emulsion of air in the thickened flocculated sludge.

The two sections 63 and 66 are, for example, cylindrical with the same diameter $d_3$ for example equal to the average diameter of the container, for example $$\frac{d_1 + d_2}{2}.$$

For 10 m³/h of liquid sludge, and an air stream of at least 60 Nm³/h, and whatever the mode of injection, the container having a cross section of 200 mm for a height of 5 m, 10 m, 30 m or more, a very strong stripping effect is observed, the air being intimately mixed with the sludge.

Regarding the flocculant, a polymer, for example a cationic polymer, will preferably be used.

For example, for a sludge containing 7 g/l of suspended matter, 50 g of crude polymer, for example prepared at 5 g/l, is used, i.e. an injection of 10 l of solution per m³ of sludge. The injection is carried out at the immediate outlet of the column of the container.

The sludges are subsequently discharged, for example under gravity, via a vented pipe (not represented), into a filtering bag (not represented), the thickened sludge being, for its part, recovered for example by pelleting so as to constitute blocks that have been thickened, by a factor of 50 for example relative to the liquid sludge at the inlet (T of suspended matter multiplied by 50 before draining in the filtering bag).

As a variant, a reagent which improves the impacts between the sludge particles can be added. It can, for example, be used in an amount of 10%, 5% or 1% of the suspended matter content of the sludges, as previously seen.

This reagent is, for example, sand, calcium carbonate, slaked lime, etc. It is introduced upstream of the column, for example in a tank for mixing with the liquid sludge (not represented).

Oxidation reagents can also be provided.

Figure 4:
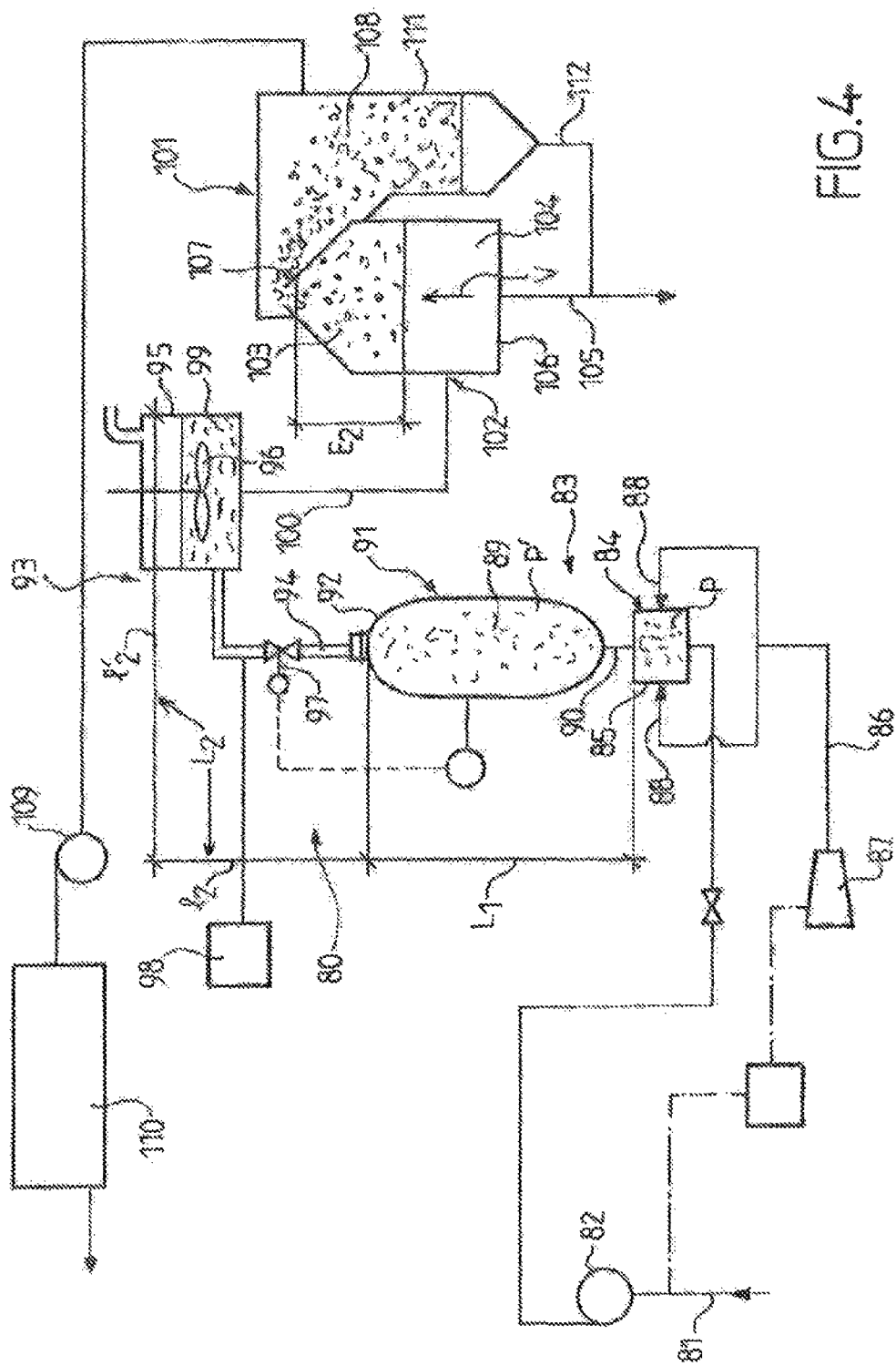
FIG. 4 shows diagrammatically a fourth embodiment according to the invention with degasser and concentrator.

FIG. 4 shows a device 80 for treating sludge 81 injected via a pump 82 into an online container 83. The container 83 comprises a first zone 84 of small volume (<50 l) formed by a first chamber 85, for example parallelepipedal or cylindrical, into which are injected, on the one hand, the sludge, for example in the bottom part at a flow rate Q, for example 10 m³/h, and, on the other hand, compressed or boosted air 86, from a booster 87, at a flow rate Q' (for example 100 Nm³/h) for example by means of two lateral tap points 88 opposite one another, perpendicularly to the sludge stream so as to form a first air/sludge emulsion 89.

The chamber 85 is, for example, at a pressure P of 5 bar absolute and is connected, via a pipe 90 having a smaller cross section than that of the chamber, for example by half (as a result forming a restriction leading to a pressure drop), to a second zone 91 formed by a second chamber 92, of approximately cylindrical, oblong or tubular shape, for example having a larger cross section than the chamber 85, for example double the length $L_1$, in which the first emulsion 89 obtained by the air/sludge mixing is at a lower pressure P', for example of 4.5 bar absolute.

The device comprises an enclosure 93 formed from a tube ending with a degassing chamber 95 equipped with stirring means 96.

The tube 94 comprises a restriction valve 97, which makes it possible to modify the pressure in the enclosure between its upstream part and its downstream part, and is equipped with means 98 for injecting a flocculant, which are known in themselves, downstream of the restriction 97, so as to form a degassed flocculated second emulsion 99 in the chamber 95.

The degassing chamber 95 is, for example, a cylindrical reservoir having a sufficient volume for discharging the excess air, and feeds under gravity, via an outlet pipe 100, a concentrating apparatus or chamber delimiting a predetermined volume, 101, which will serve as a flotation unit.

The degassed emulsion 99 reaches the bottom intermediate part 102 of the apparatus and immediately separates into solid matter 103 which rises to the surface and into transparent water 104 which is discharged under gravity at 105, continuously in a first reservoir 106 of frustro-cylindrical shape.

The solid matter 103 is discharged at the top part of the concentrator/flotation device 101 for example via a narrowed chute 107 which discharges the solid matter 108 by pumping (pump 109) to a centrifugation unit 110, with additional settling, in a supplementary reservoir 111, of the residual water at 112.

The reservoir 106 of the apparatus 101 is advantageously of small size (but not necessarily), i.e. and for example having a volume corresponding to 1% of the volume of sludge conveyed per hour, for example 100 l for 10 Nm³/h.

The reservoir is closed by the chute 107 of reduced or narrowed cross section, making it possible to maintain a slight raised pressure above 1 bar absolute, for example 1.2 bar.

With the invention, there is a totally unexpected immediate flotation phenomena, with an ascending rate V in the reservoir of 50 to 250 m/h, much higher than the rates observed with the prior art (2 to 20 m/h).

According to the invention, an extraordinary dynamic flotation effect is observed (which makes it possible in particular to provide for an apparatus of small size).

For example, a flotation unit having a surface area of 1 m² and a total volume of 1 m³ is capable of managing between 10 and 13 m³/h of sludge and 200 to 250 kg/h of suspended matter and of producing a sludge containing from 80 to 120 g/l of suspended matter.

With the invention, it is possible to leave a thickening E of the sludge bed of up to more than one metre. The ascending rate of the sludge, combined with the porosity of the sludge, also makes it possible to maintain the sludge in flotation for a very long time (of several hours if desired and if the reservoir is proportioned accordingly), which has the effect of allowing thickening of the sludge cake without being detrimental to the underlying water quality.

At the time of the rising, the sludge has a density of 0.6 to 0.9. The porosity is stable and such that, even after centrifugation at 110, for example at 3000 rpm, the sludge keeps a porosity which allows it to float on the water.

After having sufficiently thickened the sludge in the reservoir 106, and/or in the supplementary reservoir 111, as required, said sludge can be extracted by scraping, overflow, continuous pumping or in a batchwise process (in this case it is overflow via the chute which is more particularly described).

The concentrating apparatus can also be a column, or a simple or more complex tank equipped with a system for recovering the floating material and with an overflow as will now be described with reference to the following figures.

It should be noted that in the batchwise process, it is also possible to leave the sludges to thicken in a first apparatus while another is filled.

For a weight load of 200 to 250 kg/h of dry matter, an apparatus of 1 m$^3$ and 1 m of surface can for example be provided.

The sludge flotation is in fact so efficient (it is the size of the bubbles, due to the flocculation on the emulsion, which allows this, in comparison with a conventional flotation unit which pressurizes the flotation air and does not enable such a fast ascending rate and such a consistent sludge to be obtained), that a thick cake is obtained.

Said cake then forms a sort of plug of sludge exiting by extrusion via the chute 107, as overflow from the settling container.

This surprising effect makes it possible to use a container of small size capable of operating without any moving part, thus limiting the energy consumption of the assembly.

It should be recalled that the conventional flotation or thickening systems give results of 30 to 40 g/l at most, 3-fold lower than what is obtained with the invention.

The exceptional thickening obtained so rapidly according to one embodiment of the invention can have many advantages:

It makes it possible to concentrate biological sludges in order to reduce the volume entering digesters.

It makes it possible to reduce the volume of sludges at the inlet of separation equipment such as a centrifuge.

It makes it possible to operate centrifuge equipment and press-filter equipment in their optimum performance range and consequently to greatly improve, by at least 5% to 6%, or even 10%, the dryness of dehydrated sludges.

Improving the dryness, which is a consequence of the prior concentrating by the device and/or the process according to the invention, also makes it possible to remove a large part of the unbound water from the matter to be dehydrated and to reduce the equipment operating times.

Figure 5B:
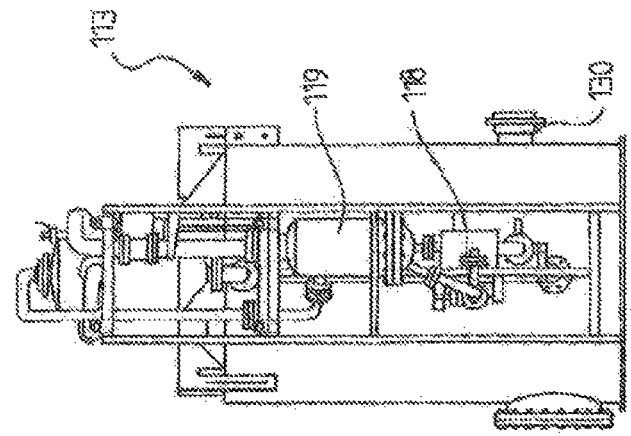
FIGS. 5A, 5B and 5C are a face-on view, a side view and a view from above of a device according to a fifth embodiment of the invention.
Figure 5A:
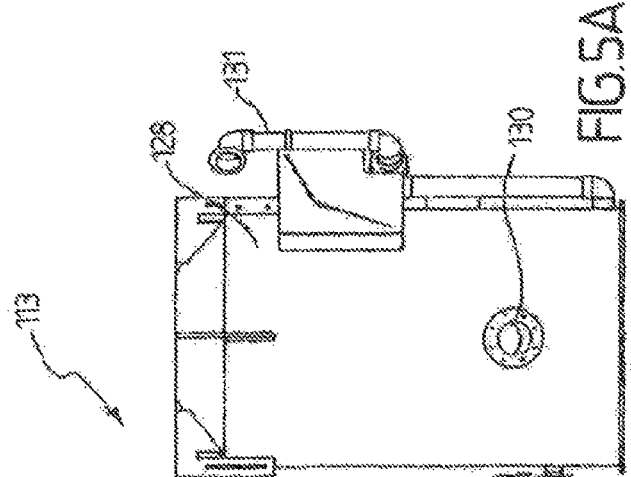
Figure 5C:
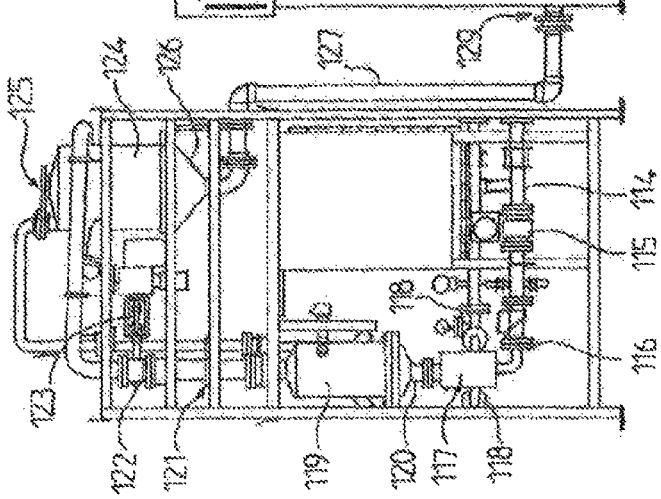

FIGS. 5A, 5B and 5C show another embodiment of a device 113 for treating effluents according to the invention.

The device 113 comprises a sludge feed, by means of piping 114 equipped with a regulator valve 115 and a mixer 116, and a cylindrical chamber 117 of small volume (for example 36 l) in the lower part.

The chamber 117 is also fed by two tap points 118 for feeding with compressed air. It is connected in the top part to a second chamber 119, via a joining pipe 120, said second chamber being cylindrical and having a volume, for example, of 500 l. It ends in the top part with a tubular enclosure 121 equipped with a Venturi 122, at the outlet of which are connected means 123 for feeding with flocculant. The tubular enclosure 121 forms a bend and feeds, in the top part, a degassing apparatus or chamber 124, open at 125 at atmospheric pressure and connected in the bottom part 126, which is for example frustoconical via a gravitational feed pipe 127, to the concentrating chamber delimiting a predetermined volume or concentrating apparatus 128.

The concentrating apparatus 128 will be described more specifically with reference to FIGS. 7A to 7C. It comprises, in addition to its feed, in the bottom part 129, with the flocculated emulsion resulting from the degassing apparatus 124, an outlet pipe 130 for the thickened sludge and an outlet pipe 131 for the transparent water obtained.

In fact, the concentrating apparatus according to the embodiment of the invention described here does not act like a conventional flotation unit in so far as the pressure of the reactor is not sufficiently high and, consequently, the size of the air bubbles is not in the micrometric range, but in the millimetric range.

This property confers on the sludge a notable ascending rate.

The ascending rate observed is therefore estimated at greater than 50 m/h, possibly reaching 100 m/h, or even 200 m/h.

The device according to the embodiment of the invention more particularly described here will make it possible to concentrate the digested sludges leaving the digester, suitable for being subsequently stored in an agitated sludge tank before centrifugation.

This configuration thus makes it possible to obtain:
Better dryness leaving the centrifuge (exceeding 30%).
Limitation of the odours: the long-term storage (greater than 4 weeks) of concentrated sludges showed an absence of odours ($H_2S$ and $NH_3$).
The possibility of using centrifuges with a slower flow rate and which cost less.

In addition to a very substantial reduction in the size of the concentrating tools, typically static or mechanical thickener (with much higher performance levels and an absence of considerable odours), the invention therefore opens up perspectives of a reduction in the size of the filtering tools (typically centrifuge), limiting expenditure.

Examples of lines and of results on biological sludges obtained with a device as described with reference to FIGS. 4 and 5 have been indicated hereinafter.

EXAMPLE NO. 1

Sludge Characteristics

The sludges consist of primary sludges and washing sludges from biostyr (addition of $FeCl_3$ and polymer multiflo entry);
They have an initial dryness of about 35 g/l-40 g/l;
The sludges no longer settle over time.
The results after implementation of the invention:
The polymer Praestol 860 BS added as it is in a proportion of 1 kg/t of suspended matter;
Dryness: 85 g/l.
These results show that it is possible to concentrate the digested sludges entering the digester by 50%, therefore making it possible to:
Very substantially increase the load of the digester by addition of third sludges.
Increase the production of biogas and promote an economically viable placing on the network (in addition to being Sustainable Development).
Improve the operation of the centrifuge, which would operate in its optimum performance range.

The invention thus makes it possible to obtain notable sludge concentration performance levels of 80 g/l to 100 g/l.

The device used is, in addition, very compact.

Thus, a device making it possible to treat 15 m³/h of sludge takes up less than 10 m² of floor space—a 50 m³/h device will not, for its part, exceed 20 m².

EXAMPLE NO. 2

Sludge Characteristics

This involves MBR (Membrane Bioreactor) sludges.

The invention in this case shows performance levels which can reach 90 g/l starting from a sludge at 40 g/l.

TABLE 1

Digested sludge concentration results

| Sludge flow rate m³/h | Suspended matter (g/l) Afnor Standard | COD subnatant mg/l |
|---|---|---|
| 11 | 81.5 | 182 |
| 11.2 | 69 | 185 |
| 11.7 | 86 | 120 |
| 11.8 | 69 | 122 |
| 11.2 | 88-86 | 130 |
| 15.6 | 75 | ND |

TABLE 2

Biological sludge concentration

| Q sludge m³/h | Suspended matter top of flotation g/l | Afnor suspended matter at flotation outlet g/l |
|---|---|---|
| 11.99 | 107 | — |
| 6.8 | — | 73 |
| 6.1 | — | 69.8 |

Average sludge flow rate=11.73 m³/h
Sludge suspended matter=15.8 g/l at inlet
Polymer flow rate=635 l/h at 3.5 g/l
Air=57 Nm³/h
Internal pressure P in the container=0.88 bar relative

TABLE 3

| Analytical parameters | Sludge at storage tank outlet | Sludge at concentrator outlet | Draining on basket of the sludge at flotation unit outlet for 30 min |
|---|---|---|---|
| Suspended matter g/l | 15.8 | 79.4 | 111.4 |
| Density in g/cm³ | 1.1 | 0.92 | 0.87 |

Figure 6:
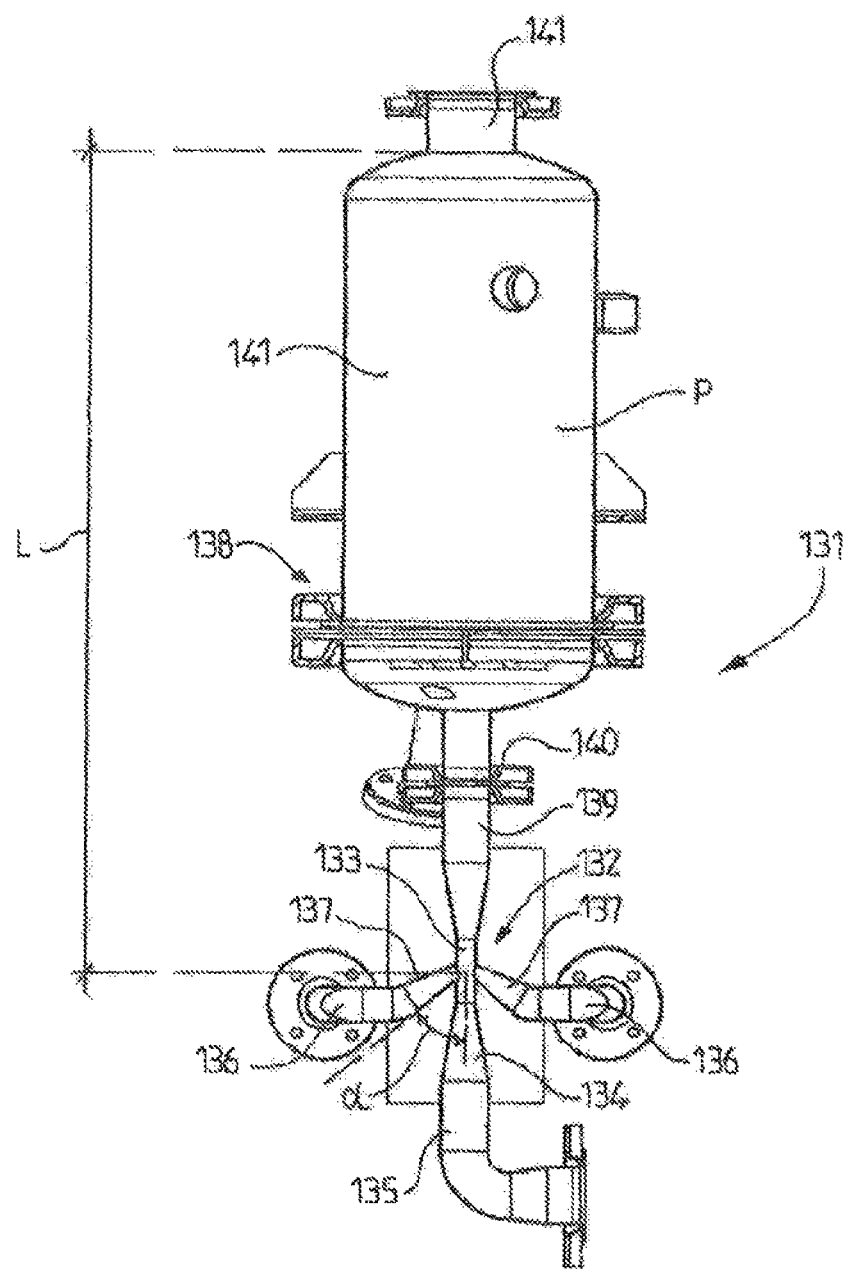
FIG. 6 is a partial side view of a device according to a sixth embodiment of the invention.

FIG. 6 shows another embodiment of a container 131 according to the invention.

The first zone 132 of small volume is in this case the central part 133 of a Venturi 134 formed on the sludge-feed piping 135, the air injections being carried out via two symmetrical pipes 136, injecting in the direction of the stream, for example with an angle α between 20° and 90°, for example 30° via frustoconical narrowings 137 which tap onto the central part 133.

The second zone 138 of the container is in this case formed by a part of piping 139 of the sludge-feed piping 135, connected, for example through a diaphragm 140 for regulating the pressure P, to a cylindrical chamber 141 of larger diameter, for example ten times the diameter of the piping 135, the whole of the first and second zones extending over a length L for example of 1 m before exit of the emulsion obtained via the top of the chamber 141, via a tap point joining with a valve or a gate (not represented).

FIGS. 7A to 7C show the concentrating apparatus 128 of FIG. 5.

Said apparatus comprises a cylindrical tank 128 equipped with an emulsion inlet via the piping 127, which has a bend, and which is centred inside the tank at a level corresponding to a third of the height of the tank.

The piping is bent at 90° and ends with a funnel-shaped outlet 152 which opens out upwards so as to allow rising of the sludge bubbles 153 which constitute a layer 154 having a height $\underline{h}$ which can be adjusted according to the flow rate.

The sludge rises in the tank at a rate of about 50 m/s and overflows into a conical central funnel 155.

The upper face 156 of the tank is in the shape of an inverted cone open in its centre 157 so as to allow the air to be released and to enable a compression of the sludge at 158 between the internal face 159 of the inverted cone and the upper edge 160 of the periphery of the funnel.

The sludge then overflows into the funnel and is discharged in the bottom part by gravity via a bent tube 161 ending with the pipe 130.

The clear water 162 is, for its part, discharged in the bottom part 163 of the tank via a vertical tube 164 allowing siphoning (arrow 165) and exiting in the top part via the turbulence 131.

Figure 8A:
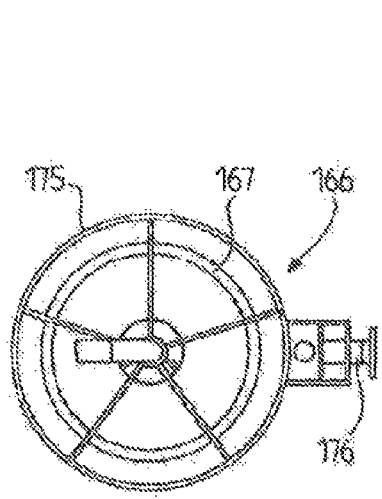
FIGS. 8A and 8B are views from above and a sectional side view of a concentrator according to another embodiment of the invention.
Figure 8B:
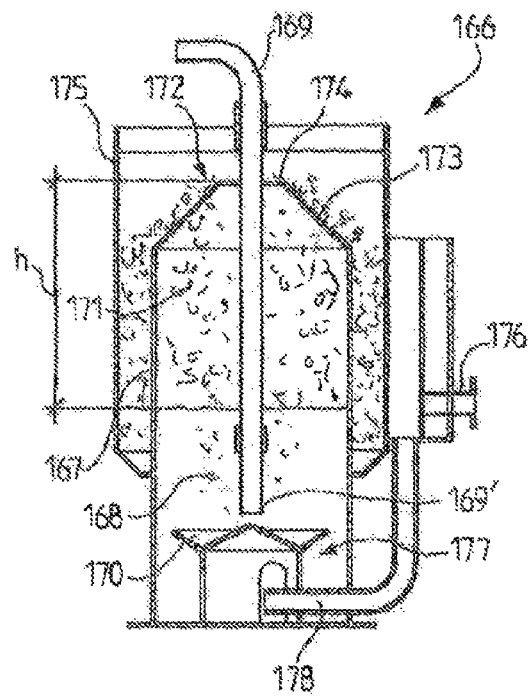

Another embodiment of a concentrating apparatus 166 that can be used according to a variant of the invention has been represented in FIGS. 8A and 8B.

It comprises a cylindrical tank 167 fed with sludge 168 via the top via a centred dip pipe 169 with an end 169' for example located at a third or a quarter of the height of the tank.

A deviation plate 170 allows the sludge to rise at a high rate so as to constitute a plug 171 of sludge which exits in the top part 172 of the tank comprising a frustoconically shaped outlet end 173, the sludge being discharged via a weir along the peripheral edge 174 into a peripheral annular reservoir 175 and then via an outlet pipe 176 in the bottom part of said annular reservoir.

The water 177 which remains in the bottom part is, for its part, discharged via an outlet turbulence 178.

Here again, it is possible to adjust the height of the layer of sludge, and therefore the settling thereof and the dryness thereof via the adjustment of the flow rates and of the nominal dimensions of the tank elements.

Figure 9:
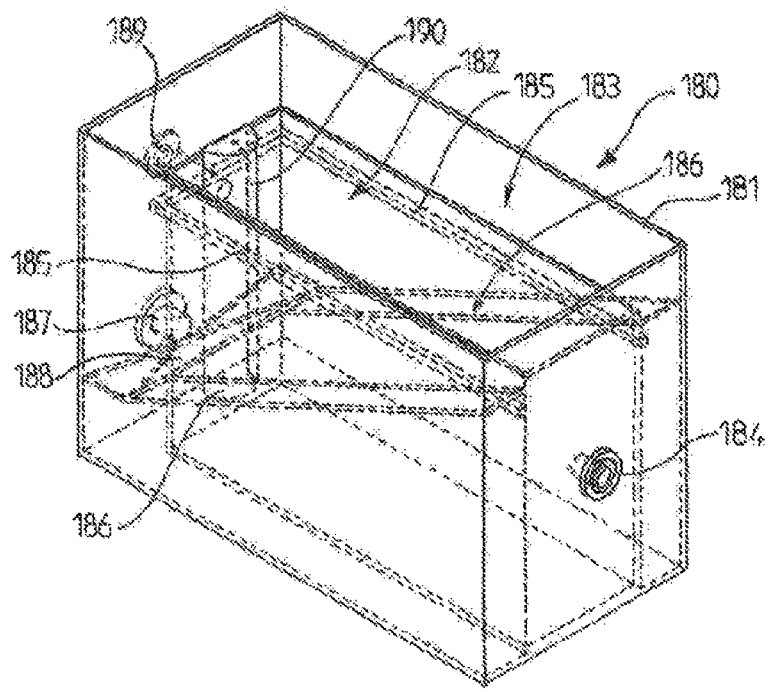
FIG. 9 is a perspective (and transparent) view of another embodiment of a concentrator/flotation unit that can be used with the invention.

FIG. 9 shows another embodiment of a concentrating apparatus 180 formed by a parallelepipedal tank 181 which has at its centre an internal chamber 182 which is also parallelepipedal, defining a space 183 between the internal walls of the tank 181 and the external walls of the chamber 182.

The sludge reaches the median part 184 of the chamber, rises by flotation, creating a plug of sludge of constant thickness, and overflows on the periphery 185 of the chamber into the annular peripheral part 183 between the walls of the chamber and of the tank.

It is recovered by means of cut-off corners 186 for example at 30° and discharged at 187 in the bottom part by means of a collecting base 189 for example in the shape of a prism.

The water is, for its part, discharged at 189 via an outlet orifice located in the top part of a vertical collecting channel 190, operating as a siphon water column.

As goes without saying and as also results from the aforementioned, the present invention is not limited to the embodiments more particularly described. On the contrary, it encompasses all the variants thereof and in particular those in which several devices are used one after the other.

The invention claimed is:

1. A process for treating and conditioning liquid sludges, in which a first sludge emulsion is created in a pressurized online container continuously fed with the sludge, via piping, at a first flow rate Q (m³/h), by blasting the sludge with air injected into the container at a flow rate Q' (Nm³/h), with Q'>5Q, the said first emulsion is discharged at the outlet of the container via a member generating a pressure drop, and then the suspended matter of the emulsion thus obtained is filtered off or left to settle, separating it from the liquid part which is continuously emptied out, wherein, in order to create said first emulsion by blasting the sludge with air, the sludge and the air are injected into a first zone with the container, and the emulsion thus formed is discharged toward a second zone of the container extending over a predetermined first length $L_1$, the injection of air and sludge into the first zone and the length $L_1$ being suitable for constituting said first emulsion formed from drops of sludge in the air, then said discharging of the first emulsion of the container is carried out via the member generating a pressure drop in a tubular enclosure extending over a predetermined second length $L_2$, into which at least one flocculant is injected, in order to obtain in said enclosure a second emulsion of air in the coagulated and flocculated sludge, and in that said second emulsion is at least partially degassed by venting of the enclosure before said filtration or settling.

2. The process according to claim 1, wherein the first zone has a small volume less than 0.05 m³.

3. The process according to claim 1, wherein the predetermined first length $L_1$ is greater than 50 cm.

4. The process according to claim 3, wherein the predetermined second length $L_2$ is greater than 1 m.

5. The process according to claim 1, wherein the average pressure P in the container is such that 1.5 bar<P<10 bar and Q' is such that 10 Q≤Q'≤100 Q.

6. The process according to claim 1, wherein the emulsion is strongly degassed at the outlet of the container, inside a degassing chamber equipped with stirring means.

7. The process according to claim 1, wherein the online container is a column with an average diameter d and a height H≥10 d, the sludge being introduced in the bottom part of the column in the gaseous bed created by the air injected at the level of said sludge feed.

8. The process according to claim 7, wherein the liquid sludge is projected in the column onto an internal screen or wall of the container so as to improve the breaking up of said sludge in the gaseous stream.

9. The process according to claim 1, wherein the sludge is introduced in the bottom part of the container via a static mixer.

10. The process according to claim 1, wherein the flocculant is a polymer injected at immediate outlet of the container, before the venting.

11. The process according to claim 1, wherein at least one reagent taken from sand, calcium carbonate, slaked lime, the oxidation reagents and/or the reagents assisting coagulation is introduced upstream of the container into the sludge stream.

12. The process according to claim 1, wherein at least one reagent taken from sand, calcium carbonate, slaked lime, the oxidation reagents and/or the reagents assisting coagulation is introduced downstream of the container.

13. The process according to claim 1, wherein the enclosure is tubular with an average through-cross-section equivalent to that of the container.

14. The process according to claim 13, wherein the enclosure comprises at least one element which generates a pressure drop downstream of the outlet of the container, at the outlet of which the flocculant is injected.

15. The process according to claim 14, wherein the enclosure comprises at least one second element which generates a pressure drop upstream of the first generator element, at the outlet of which at least one reagent and/or air are introduced.

16. The process according to claim 1, wherein the element (s) which generate(s) a pressure drop is (are) Venturis.

17. The process according to claim 1, wherein a rapid and/or substantially instantaneous concentration of the sludges is carried out by flotation/settling of the flocculated emulsion in a volume acting as a concentrator.

18. The process according to claim 17, wherein the sludge is discharged by overflow from the concentrator.

19. The process according to claim 1, wherein a treatment of the sludges is carried out downstream of the tubular enclosure by centrifugation, filtration and/or pressing.

20. The process according to 1, wherein the air injected is heated and/or mixed with water vapour.

21. The process according to claim 1, wherein the air is injected so as to form a helicoidal flow in the sludge stream.

22. A device for treating and conditioning liquid sludges, comprising;

an online container, means for continuously feeding said container with sludge, comprising feed tubing, at a first flow rate Q (m³/h), means for feeding said container with air at a flow rate Q' (Nm³/h), with Q'>5Q, and means for filtering and/or settling the emulsion thus flocculated, arranged in order to separate the liquid part from the suspended matter and to recover it continuously, wherein the means for feeding the container with sludge and air are arranged in order to inject the sludge and air into a first zone of the container, then to convey the mixture over a first length $L_1$ in order to form a first emulsion of drops of sludge in air, and in that it comprises an enclosure for discharge of the first emulsion obtained in the container via a member generating a pressure drop, the enclosure being tubular extending over a predetermined length $L_2$, comprising venting means and means for injecting at least one flocculant into said tubular enclosure upstream with respect to said venting, so as to form a second emulsion of air in the coagulated and flocculated sludge.

23. The device according to claim 22, wherein the first zone of the container has a small volume less than 0.05 m³ confined between two through-walls.

24. The device according to claim 22, wherein the online container is a column with an average diameter d and a height H≥10 d, the sludge being introduced in the bottom part of the column in the gaseous bed created by the air injected at the level of said sludge feed.

25. The device according to claim 24, wherein the column comprises, in addition, an internal screen placed at the outlet of the means for injection into the column, for breaking up the jet of sludge.

26. The device according to claim 22, wherein it comprises a static mixer of the sludge upstream of the container.

27. The device according claim 22, wherein the enclosure is tubular with an average through-cross-section equivalent to that of the container.

28. The device according to claim 27, wherein the tubular enclosure comprises at least one element which generates a pressure drop downstream of the outlet of the container, at the outlet of which the flocculant is injected.

29. The device according to claim 28, wherein the tubular enclosure comprises at least one second element which generates a pressure drop before the first generator element, at the outlet of which at least one reagent and/or air are introduced.

30. The device according to claim 28, wherein the element(s) which generate(s) a pressure drop is (are) Venturis.

31. The device according to claim 22, wherein it comprises, in addition, a degassing chamber downstream of the container equipped with stirring means.

32. The device according to claim 22, wherein it comprises, in addition, a volume downstream of the enclosure acting as a concentrator arranged so as to allow the flotation of the flocculated sludge on a predetermined height.

33. The device according to claim 32, wherein the volume comprises means for discharging the sludge via an overflow.

* * * * *